Jan. 31, 1956  C. W. BRANDON  2,732,687
APPARATUS FOR THE STORAGE OF VOLATILE LIQUIDS
Original Filed July 16, 1948  3 Sheets-Sheet 1
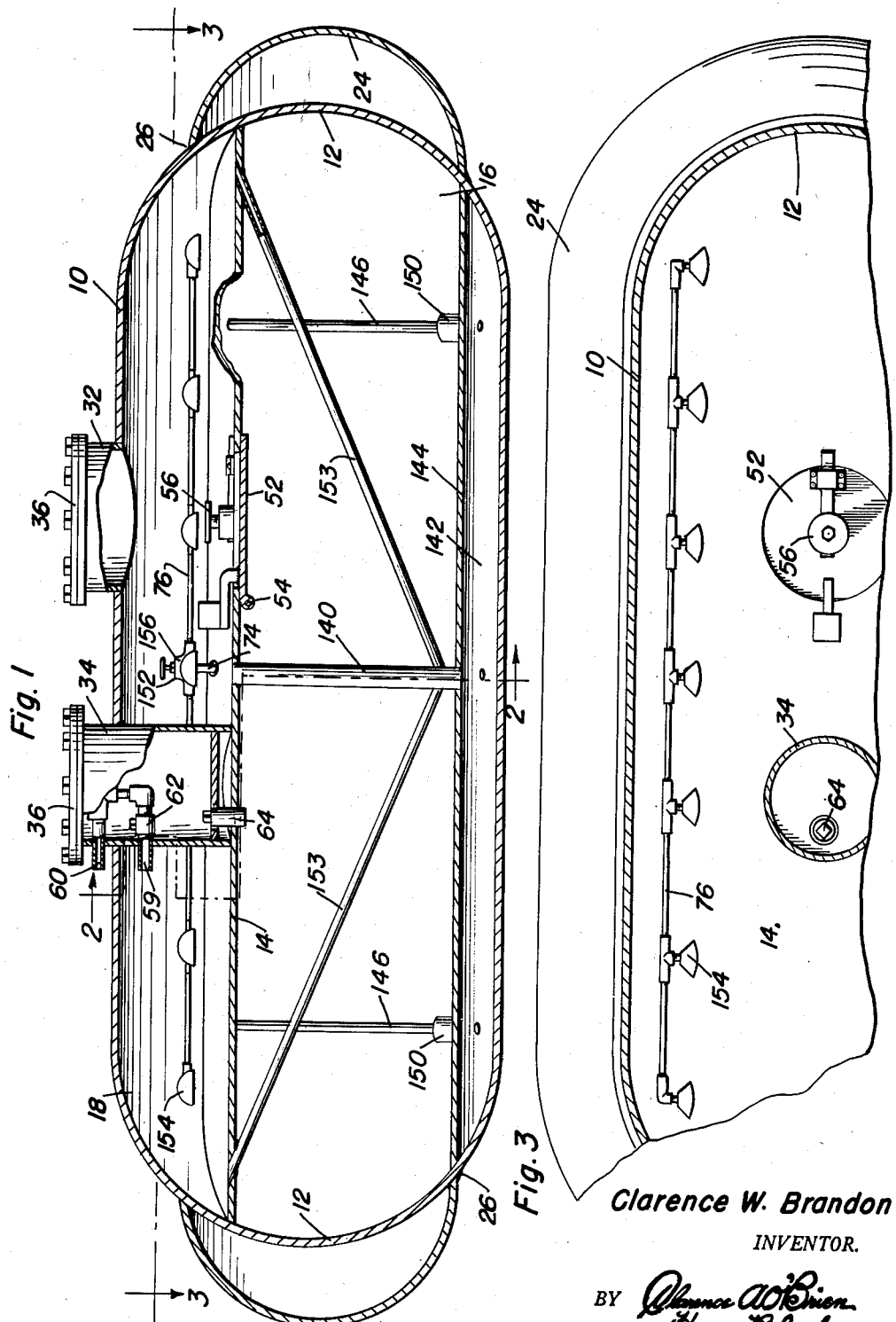
Clarence W. Brandon
INVENTOR.

Jan. 31, 1956
C. W. BRANDON
2,732,687
APPARATUS FOR THE STORAGE OF VOLATILE LIQUIDS
Original Filed July 16, 1948
3 Sheets-Sheet 2
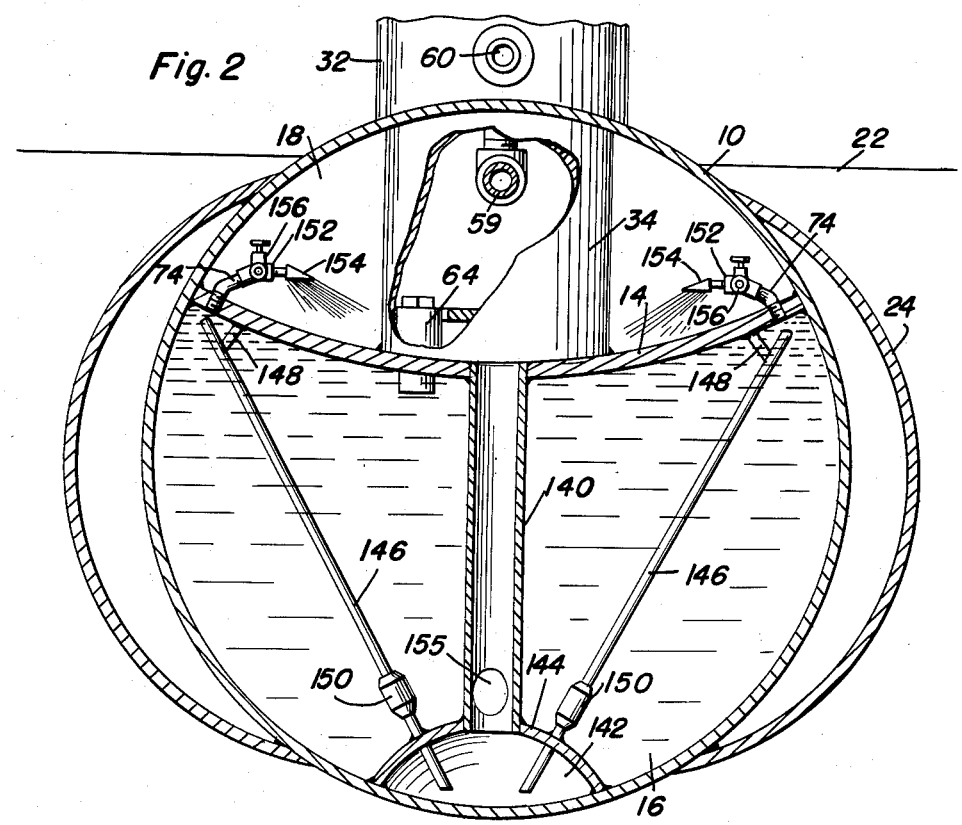
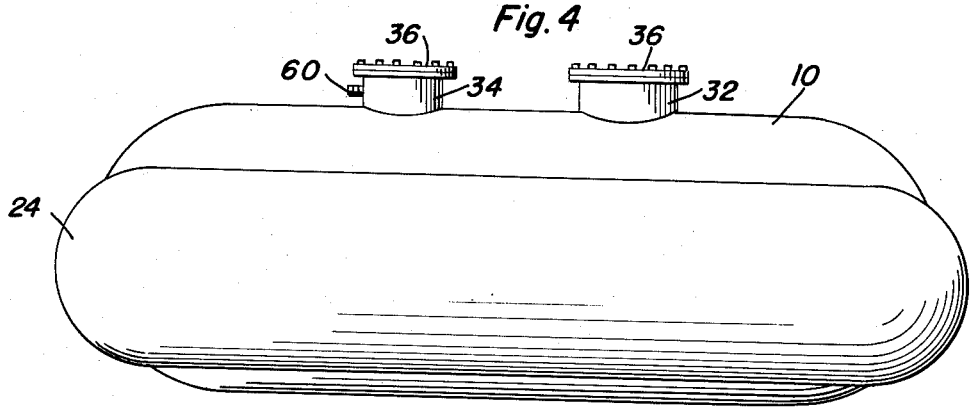
Clarence W. Brandon
INVENTOR.
BY *Clarence A. O'Brien
and Harvey B. Jackson*
Attorneys Jan. 31, 1956 C. W. BRANDON 2,732,687
APPARATUS FOR THE STORAGE OF VOLATILE LIQUIDS
Original Filed July 16, 1948 3 Sheets-Sheet 3

Clarence W. Brandon
INVENTOR.

United States Patent Office 2,732,687
Patented Jan. 31, 1956

2,732,687
APPARATUS FOR THE STORAGE OF VOLATILE LIQUIDS

Clarence W. Brandon, Tallahassee, Fla., assignor, by direct and mesne assignments, of fifteen per cent to Harvey B. Jacobson, Washington, D. C., and forty-two and one-half per cent to N. A. Hardin, Hazel H. Wright, and Catherine H. Newton, all of Forsyth, Ga.

Original application July 16, 1948, Serial No. 39,154. Divided and this application June 6, 1951, Serial No. 230,124

27 Claims. (Cl. 62—1)

This invention relates to novel and useful improvements in a method and apparatus for the storage, refrigeration and transportation of volatile liquids and other fluids, and more particularly has reference to a method and apparatus for improving the transportation and storage of such fluids with particular attention to reducing excessive pressures and temperatures generated in fluids which are confined in containers and are exposed to external sources of heat. This invention finds its specific utility in its application to a method and apparatus for efficaciously confining highly volatile liquids such as liquefied petroleum gases, ammonia or the like in tanks such as barges.

This application is a division of my prior application, Serial No. 39,154, filed July 16, 1948 for Method and Apparatus for the Storage, Refrigeration and Transportation of Volatile Liquids and Other Fluids, now Patent No. 2,689,461 of September 21, 1954.

In its simpler aspects and broadest principles, the present invention represents an improvement upon and relates to somewhat similar subject matter to that disclosed in the prior patent of Clarence W. Brandon and George M. Brandon, Patent No. 2,408,505, patented October 1, 1946.

In the field of transportation and storage of volatile liquids, and especially in the use of tanks or barges which are designed to transport liquid upon waterways, it has been heretofore recognized as essential that the compartment receiving the volatile liquid shall be completely filled in order to avoid the detrimental effects of splashing or shifting centers of gravity of a container which is partially filled and subjected to a rolling or tossing action during transit. Industry has long known that when such tanks are employed as containers for volatile liquids in barges and are completely filled with highly volatile or other liquids, and subjected to external sources of heat, such as to the variable temperatures produced by the rays and heat of the sun or the like, the increase in temperature of the liquids which completely fill and are confined in a storage compartment, produce very great increases in the pressures to which such liquids are subjected.

By way of illustration, it may be noted that in one type of barge or tank, which is approximately 90 feet in length and of about 9 feet in diameter, the pressures of the contained liquid where no vapor space is provided, and consequently to which the walls of the container are exposed, may rise from slightly above atmospheric pressure to values of about 450 pounds per square inch, at which pressures rupture of the container is threatened unless pressure relief is provided, these pressures arising directly and solely from the thermo-dynamic expansive forces created in the liquid contents of the tanks by the heat of the sun's rays or the like. Obviously, it has been necessary therefore to employ tanks of very thick metallic plate construction, the example above mentioned usually requiring metal plates of 1⅛ inch in thickness.

It will be apparent that if some means were provided for reducing the pressures generated by the expansion of the liquid contents occasioned by the above mentioned source, and maintaining the maximum pressures thus generated to predetermined lower and safer limits than would normally occur with no provision for the relief of pressure, the tanks could be of much lighter material with a resultant appreciable economy in the constructing, handling and transporting of the same.

As a primary purpose, the invention aims to provide a tank for receiving volatile liquids which may be of appreciably lighter and more economical construction, yet will be more serviceable in use than conventional containers heretofore used.

Accordingly, it is a fundamental intention of this invention to provide a process and a means for reducing the pressures to which the confined liquids in such tanks are subjected; to utilize the thermo-dynamic forces developed within the body of liquids in such tanks for carrying out the method and actuating the apparatus designed to alleviate the above mentioned detrimental conditions; and in particular to provide a refrigerating system in which the liquid itself constitutes the refrigerant, whereby the thermo-dynamic forces developed within the confined liquid will cause a circulation of the refrigerated portions of the liquid to thereby lower the temperatures existing in the liquid and hence reduce the thermo-dynamic pressures developed therein; and by further providing an extremely sensitive auxiliary refrigerating system incorporated in the above elements and which shall be periodically and intermittently operated by thermo-dynamic forces in confined bodies of liquids to effect the above mentioned functions and purposes.

This invention therefore has for its primary objects the development of improved methods and apparatus for reducing the peak or maximum pressures which are thermodynamically generated within confined bodies of volatile liquids.

A further object of the invention is to provide a method and apparatus wherein a portion of the volatile liquid is utilized to produce a refrigerating effect upon the main body of the liquid to thereby lessen the pressures to which the confined body of liquid is subjected.

Still another object of the invention is to provide a method and apparatus wherein the thermo-dynamic pressures generated within a confined body of liquid are utilized to temporarily discharge a portion of that liquid for reducing the maximum pressure to which the confined body of liquid is subjected.

Yet another very important object of the invention resides in the provision of a method and apparatus as set forth in the preceding objects wherein the variations in pressure produced in a confined body of volatile liquid by the influence of varying temperatures thereon, are utilized to effect a cyclic flow of a portion of the liquid out of and back into the confined body of liquid to thus reduce the extremes of pressure to which the confined liquid is subjected.

An additional object of the invention is to provide an apparatus and method in accordance with the preceding object wherein the cyclic circulation of liquid from the confined body is caused to suffer an expansion or drop in pressure during the course of its flow from and back into the confined body, which expansion is utilized to effect a refrigerating action upon the balance of the confined body of liquid.

Another very important object is to provide a very compact, efficient and improved conduit system for circulating a portion of the stored liquid for an efficient refrigerating action upon predetermined areas of the surface of the container, in heat exchange relation with and for cooling predetermined portions of the contents of the tank.

Still another important object of the invention resides in the provision of an apparatus and method as set forth in the foregoing objects wherein the liquid withdrawn from the storage compartment of the tank is removed from the cooler portions thereof, and wherein the circulating refrigerated portion of the liquid are returned to the upper or warmer portions of the storage tank.

A still further intention of the invention is to provide a method and apparatus for effecting a circulation of a portion of the contents of a confined body of volatile liquid from that body of liquid, through a pressure reducing zone and finally discharging that portion of the liquid by means of a spray into an area of low pressure for effecting a cooling effect upon predetermined portions of the confined body of liquid, then collecting the condensate from the pressure expanded portion and subsequently returning the condensate to the confined body of liquid during the next period of relatively reduced pressure therein.

A further and very important object of the invention is to provide a method and apparatus for refrigerating confined bodies of liquid subjected to varying thermo-dynamic pressures therein by withdrawing, circulating and returning a portion of the confined liquids by means of the thermo-dynamic pressures to which they are subjected in the confined body, and by so arranging the course of travel of the withdrawn portion as to subject that portion to the immediate influence of the external source of heat to which the confined body of liquid is subjected in order to thereby obtain a more rapid and hence more sensitive fluctuation of pressure in the withdrawn portion of the liquid and in the confined body with a view to causing a more rapid series of intermittent refrigerating operations upon the confined body of liquid.

Another object of the invention is to provide a method and apparatus as set forth in the foregoing objects wherein provision is made for releasing the pressure upon the confined body of liquid and for venting the same, without loss of liquid or its vapor, to facilitate the loading or unloading of the tank.

An important feature of the invention resides in the provision of a storage tank or container which is divided by a partition into a storage compartment for confining bodies of volatile liquids and a vapor compartment, each of these compartments being sealed from the atmosphere together with conduit means connecting these compartments for automatically effecting a flow of liquid from the liquid compartment to the vapor compartment and for effecting a return of liquid condensate from the vapor compartment into the confined liquid storage compartment.

A further feature of the invention resides in the provision of an apparatus as set forth in the preceding paragraph wherein pressure relief valve means are provided for controlling the flow of liquid through the conduit means from the storage compartment to the vapor compartment, for thereby effecting a reduction of pressure upon the withdrawn liquid for producing a vaporizing and refrigerating effect thereby.

An additional feature of the invention resides in the provision of a tank which is ideally adapted for use as a barge and wherein there are provided blisters upon the sides of the same for improving the stability of the barge, for increasing the constructional strength of the tank, and for assisting in cooling the contents of the same.

Yet another feature of the invention resides in the provision of a barge for the transportation of volatile liquids upon waterways, wherein the blister construction is arranged to overlie a portion of the vapor compartment formed within the barge to effect a greater cooling effect thereon and to thereby improve the refrigerating of the contents of the barge.

Another important feature of the invention resides in the provision of a barge having a lower confined liquid storage compartment and an upper confined vapor compartment, together with conduit means and mechanism for effecting periodic cyclic circulations of liquid from the warmer or cooler portions selectively of the confined body of liquid into the vapor chamber, reducing the pressure upon the liquid so inducted into the vapor chamber to produce a refrigerating effect therein, collecting the condensate of the liquid inducted into the vapor chamber in cooler portions thereof, and subsequently returning the collected condensate into the confined chamber at the hotter portions thereof.

Still another important feature of the invention resides in the provision of a container for volatile liquids having separated liquid storage and vapor compartments, and wherein the vapor compartment is provided with sloping channels or gutters for collecting the liquid condensate therein into a sump together with conduit means for automatically and periodically withdrawing the condensate from the sump in response to pressure variations effected by the thermo-dynamic action of external sources of heat upon confined portions of the volatile liquid.

These, together with various ancillary objects and features of the invention, which will later become apparent as the following description proceeds, are attained by this invention, preferred embodiments of the methods and apparatuses of which have been illustrated, by way of example only of the principles thereof, in the accompanying drawings, wherein:

Figure 1 is a vertical longitudinal sectional view, parts being broken away, of a barge in accordance with the principles of this invention, this arrangement disclosing the location of the condensate sump at the coolest portion of the storage compartment for realizing the maximum cooling effect upon the collected condensate prior to its return to the confined storage compartment.

Figure 2 is a vertical transverse sectional detail view, parts being broken away and showing the interior construction and arrangement, this view being taken upon an enlarged scale substantially upon the plane indicated by the section line 2—2 of Figure 1;

Figure 3 is a fragmentary horizontal sectional view through the arrangement of Figure 1, taken substantially upon the plane indicated by section line 3—3 of Figure 1, this view showing a satisfactory arrangement of the spray nozzles in the vapor compartment;

Figure 4 is a side elevational view of the barge of Figure 1 showing the sponson or blister construction forming a part of the barge.

Figure 5:
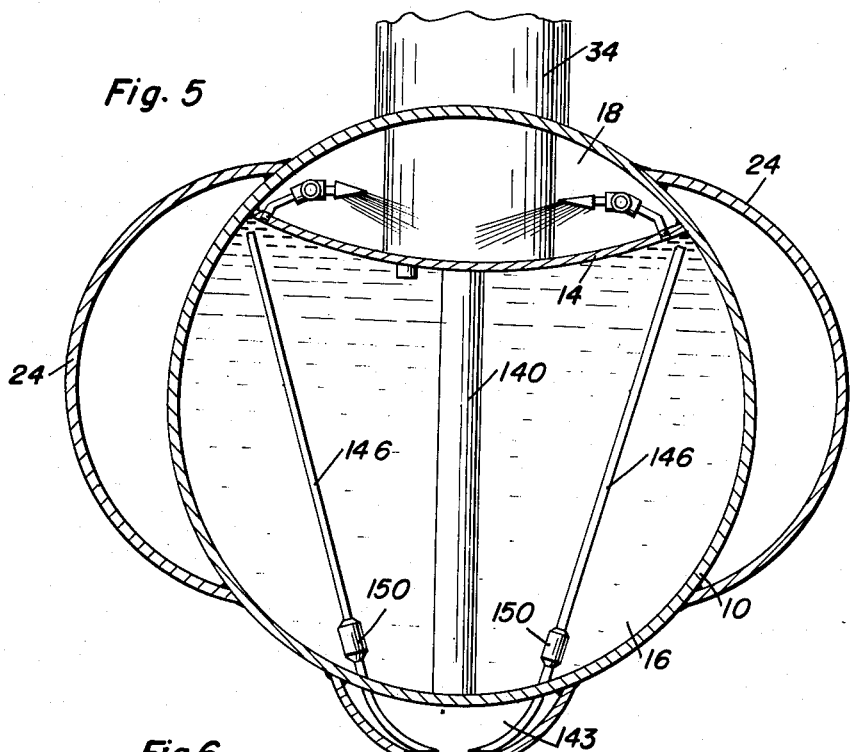
Figures 5 and 6 are fragmentary views similar to Figure 2 but showing modified forms of sump construction.

Reference is now made more specifically to the accompanying drawings, for an understanding of the principles of construction and features of operation of this invention, the numerals applied to the various parts of the drawings being the same as those employed for the same parts in my co-pending application Serial No. 39,154.

There is disclosed in Figures 1–4, a practical embodiment of tank for storing volatile liquids, which tank itself is designed to function as a barge in accordance with the basic concept of this invention. Although it is to be understood that the tank may be of various shapes and proportions, and is not to be limited to that illustrated, a satisfactory embodiment may consist of a cylindrical elongated casing or container 10 having spherically rounded end portions 12, this tank being of metallic plate or the like, although any suitable material may be employed having the requisite strength.

Within the tank 10, and preferably although not necessarily extending through the entire length thereof, is a partition 14 which divides the tank into a lower compartment 16 consisting of a storage chamber for receiving and containing volatile liquids therein, and an upper compartment 18 comprising a vapor chamber. As will readily be understood, the chambers 16 and 18 are completely sealed from each other by means of the partition 14, and preferably comprise pressure-tight chambers.

In this embodiment of the invention, it will be seen that the partition 14 is shaped as an arcuate plate having its lower or convex surface forming a part of the wall of the volatile liquid storage chamber 16, while its upper or concave surface forms a part of the wall of the vapor chamber 18. The vapor chamber 18 is thus ellipsoidally shaped in cross section.

It will thus be seen that the concave surface of the partition 14 constitutes the bottom wall or floor of the vapor chamber 18, and slopes from both sides towards the center thereof, thus providing a longitudinally extending, centrally disposed trough or channel. The lowermost point of the vapor chamber 18 will thus be the longitudinal center line of the partition 14, and consequently the condensate and liquid accumulating in the vapor chamber will collect along the longitudinal center thereof. At one or more points along its length, as desired, downwardly extending conduits 140 are terminally connected to freely communicate with the vapor chamber 18 at its lowermost portion, and with a sump or sumps 142 which are preferably positioned within the tank 10 and at the lowermost portion thereof.

This sump compartment or compartments may be defined by longitudinally extending arcuate housings 144, which may be welded or otherwise secured to the bottom inner wall of the tank 10 and to the outer circumference of the conduits 140. Obviously, a single such sump may be provided extending throughout all or any desired portion of the length of the tank 10, or if desired a plurality of such sumps or compartments may be formed, each communicating with the chamber 18. Thus, any condensate or liquid received in the vapor chamber 18 will be drained by gravity through the conduit or conduits 140 into the sump compartment 142 which is thus positioned at the coolest region of the tank. From the sump 142, extend a plurality of return conduits 146, the upper ends of these conduits being suitably braced or attached as at 148 to the under surface of the partition 14, in a position to discharge in the hottest zones of the storage chamber 16, such as the regions bounded by the arcuate walls of the partition 14 and the tank 10. The return conduits 146 are provided with non-return check valve assemblies 150 which may be of any suitable type such, for example, as that indicated in the valve casing 104 of Figure 14 of my co-pending application, to readily permit flow of fluid upwardly from the sump 142 into the storage compartment 16 but to prevent return flow. Spray nozzle assemblies 152, provided with deflectors 154 and with pressure reduction valve assemblies 156, establish communication with vapor chamber 18 and the storage chamber 16 at the highest point of the latter. Obviously, the spray nozzles, pressure reduction valves and necessary conduits may be of any of the known and conventional constructions, and these discharge conduit systems may communicate with the uppermost portion of the storage chamber 16 or if desired may have their inlet ends extending down into the liquid adjacent the lower portion of the storage chamber.

A conduit system to be specifically set forth hereinafter is provided for establishing controlled communication between the storage chamber 16 and the vapor chamber 18. It is contemplated that the storage chamber 16 shall be filled with the volatile liquid to be transported at all times, and said body of liquid completely filling the chamber 16 will be confined therein. The curved walls of the chamber 16 thus are ideally adapted to offer the maximum strength for retaining the confined liquid and the pressures generated therein by the thermodynamic action upon the confined liquid of varying increases in temperature effected by the sun's rays upon the tank or by other external sources of heat. It is intended that when the tank is constructed as a barge as illustrated in this embodiment of the invention, that the continuously completely filled storage compartment 16 and the vapor chamber 18 thereabove will be immersed into water to an extent indicated by the water line or level 22.

In order to promote the stability of the barge when the same is immersed in the water, a blister construction is secured thereto as by welding or in any other manner. This blister construction consists of an arcuately shaped casing 24 which is secured to the tank 10 as by welding 26 or the like, and thus defines convex extensions protruding laterally from the walls of the tank 10.

It is contemplated that the blisters or sponsons 24 will provide greater buoyancy for the barge, will improve the stability of the same against rocking or rolling as in heavy seas, will reinforce and strengthen the side walls of the barge, and will serve other purposes as set forth hereinafter.

The uppermost junction of the blister 24 with the wall 10 will preferably be below the normal water line 22 of the loaded tank, but will overlie the line of junction of the partition 14 with the wall 10, whereby the top of the blister will constitute a shield or screen which will tend to shade and to some extent protect the vapor chamber from the direct heating effect of the sun's rays or the like and will further insulate the storage compartment from the heating effects of the relatively warmer, upper layer of water in which the tank is immersed, to thus assist in producing a cooling effect upon these troughs, and channels. It should be here noted, and this principle is advantageously employed by this invention, that the temperature of open bodies of water even a slight distance below the surface remains at a relatively cooler and less rapidly variable temperature than the surface layer. Consequently, in a barge immersed therein, the lower portion of the barge and its contents will be substantially cooled relative to its upper portion.

Surmounting the top surface of the tank 10 is a plurality of domes, any desired number being provided, two being indicated by the numerals 32 and 34, these domes conveniently but not necessarily consisting of tubular members secured to and passing through the upper surface of the tank 10 and extending thereabove to be provided with detachable closures or covers 36 of any desired construction. Preferably one of these domes, such as that indicated at 32 provides a means for obtaining access to the vapor compartment 18, and to the mechanism housed therein; while another of the domes, such as that indicated at 34, extends through the vapor compartment 18 and is attached to the partition 14 to provide a well or other chamber containing various control means for the mechanism with which the barge is provided.

It is, of course, to be understood that it is within the purview of this invention to contour the blisters at the front or rear of the barge tanks in any desired manner to facilitate and improve the operation of the tank as a barge, as by forming a prow, a stern, a rudder or the like thereon.

Attention is now again directed to Figure 1 wherein it will be seen that the partition 14 is provided with suitable covers 52 which are hinged as at 54 for controlling manholes in the partition by means of which access may be obtained to the interior of the storage compartment 16, these hinged manhole covers being provided with locking means such as a locking wheel 56 of any known and suitable construction. Obviously, any desired number of these manhole covers may be provided throughout the length of the partition 14. It is to be understood that this construction may be employed in any of the various embodiments of the invention disclosed and set forth hereinafter, as desired.

A pressure relief or safety device means is provided for preventing the attainment of a pressure in the vapor chamber 18 above a predetermined desired safe maximum pressure, and for this purpose, as shown in Figure 1, there is provided a conduit 59, extending through the tower 34 into the interior of the vapor compartment 18, which conduit has an outer end 60 extending through the upper wall of the tower 34 into free communication with the atmosphere, a suitable pressure relief valve 62 of any desired construction being included in the conduit and preferably positioned within the well defined by the tower 34 for easy access thereto for inspection, repairs or adjustment of the valve as desired. By this means, provision is made for preventing the pressure within the vapor chamber 18 from exceeding a predetermined value for which the valve 62 is set. Also indicated in the tower 34 is a plug 64 affording communication to the interior of the storage compartment 18 for filling or withdrawing liquid as desired.

It will be evident that when the volatile liquid storage compartment 16 is completely filled with liquid in accordance with conventional practice during the transportation or storage of liquids in tanks such as those with which the present invention is concerned, that when the temperature to which the confined liquid is subjected is increased, there is a corresponding pressure increase upon the confined liquid, since there is no space for expansion within the storage compartment 16, and since the metallic walls of the same are of negligible expansive qualities. Obviously, if some means were not provided for decreasing the pressures thermodynamically generated within the confined liquid, dangerous pressures would soon be reached which would threaten the rupture of the tank which would be attended by various hazards. In accordance with the basic concept of this invention, means are provided for first, withdrawing some of the contents of the storage compartment 16 for directly lowering the pressure thereof, second, utilizing the pressure drop of the withdrawn portion of the contents to produce a refrigerating effect which will tend to lower the temperature and thus further reduce the pressure of the confined liquid in the compartment 16, and third, when the contents of the storage compartment 16 have relatively cooled so that the remaining liquid therein would be subjected to a sub-atmospheric pressure or a relatively reduced pressure below normal upon cooling of the tank, to reintroduce the withdrawn portion of the liquid to restore or equalize the pressure within the compartment 16 to its original value.

Obviously, the necessary piping or conduit system may be arranged in various ways, in order to obtain any satisfactory number of spray nozzles, positioned to direct their spray over any desired area or portion of the partition 14. Preferably, the piping system is disposed in either direct contact with or in any event in intimate heat exchange relation with the upper surface of the partition 14, and the spray nozzles and deflectors are positioned to direct the spray to cover any desired portion of the partition.

As will be clearly apparent by reference to Figures 1 and 2, the conduit 140, if but one such conduit is provided, will be preferably located at about the center of the tank 10, and will be provided with branch conduits 153 which communicate with the central, longitudinally extending trough upon the upper surface of the partition 14 adjacent the ends thereof and drain liquid accumulating therein by means of orifices 155 in the lower ends of the conduit 140, so that any liquid accumulating in the vapor chamber 18 may be constantly returned to the sump 142.

As shown in the detail view of Figure 3, the discharge conduit spray system of Figure 2 may conveniently include longitudinally extending headers 176 along which are connected the above-mentioned reduction valves 156 with spray nozzles and spray baffles 154, the headers 176 being preferably located parallel to and closely adjacent the junction of the partition 14 with the tank 10.

Pressure reduction valves 156 are associated with each of the outlet conduits 74 and may be conveniently located at the junction of the same with the transverse pipes 76. These pressure release valves may conveniently be disposed adjacent the tower 34, whereby their control wheels may be positioned within the tower 34 for convenient manipulation of all of the valves for manually opening the same as desired. In this connection it is observed that it is contemplated in this invention to open the valves 152 in order to vent the interior of the storage compartment 16 to the vapor chamber 18 through the above-mentioned conduit system, in order to allow vapor exchange between the vapor compartment 18 and the storage compartment 16 when the latter is being filled with fluids.

Preferably, the pressure release valves 152 are spring loaded to maintain a desired pressure within the storage compartment 16, so that when this pressure is exceeded by the above-mentioned thermodynamic action of temperature upon the volatile liquids within the storage compartment, the rising pressure will force a portion of the liquids through the outlet conduit system, through the spray nozzles and discharge the same into the vapor compartment 18.

It is very important to here observe that as this flow of a portion of the volatile liquid is effected from the storage compartment 16 under the influence of the rising pressures therein which exceed the pressure for which the release valves 152 have been set, the discharging liquid in passing the spring loaded pressure relief valves will be subjected to a pressure drop or will be expanded in its travel through the following conduit system. As is well known, fluids when subjected to a diminution of pressure and are expanded are refrigerated or chilled thereby, and the present invention makes use of this pressure drop of the discharged or withdrawn fluids to effect a refrigerating or cooling action upon the tank.

In the arrangement shown in Figures 1 and 3, it will be observed that the piping and spray system is such as to cover substantially the entire area of the partition 14 with the discharged or withdrawn portion of the volatile liquid passed through the spray nozzles. Of course, various arrangements of conduits and spraying nozzles could be employed to confine the spraying and cooling action to any desired portions of the partition 14. It should be here noted that the discharging portion of the volatile liquid passing through the conduit system will be at least partially vaporized by the release in pressure, so that in practice vapor and/or liquid under reduced pressure will be discharged into the vapor chamber 18 and since the latter is sealed, will thereby produce a pressure therein which, however, will be less than the pressure then prevailing in the storage chamber 16 when the contents of the latter are at an elevated temperature, but will vary with respect thereto as occasioned by the action of the pressure release valve 156 and as set forth hereinafter in the operation of the circulating refrigerating system.

As will be further understood, the magnitude of the cooling action can be somewhat proportioned or regulated by properly adjusting the differences in pressure maintained in the storage compartment 16 by the loading of the pressure release valve 156 and the pressure maintained as a maximum in the vapor compartment 18 by means of the safety release valve 62.

As will be evident, the ejection of a portion of the contents of the tank 16 will thus serve to reduce the pressure rises created in the storage compartment as the liquid contents thereof are expanded by heat, and the pressure rise therein is further alleviated by the refrigerating or cooling action which converts the pressure drop of the expelled liquids in the vapor chamber into a heat absorbing medium for thereby cooling the partition 14 and hence the upper portion of the contents of the storage tank 16 which immediately underlies the partition. As will be seen, it is the upper portion of the tank which is subjected to the greatest effects of the temperature rise of the confined liquids, and hence the refrigerating action is thereby most efficiently applied.

The operation of this form of the invention is as follows. Upon an increase in temperature and hence of pressure of the fluid within the storage chamber 16, which as in all the embodiments of the invention is to be understood as being at all times completely filled with the volatile liquid, the fluid therein expands and is discharged to the pressure reduction valve 156 and spray nozzles 152 into the interior of the vapor chamber 18, the pressure reduction of the discharging fluid serving to chill or refrigerate the partition 14 and hence of the volatile liquid in the chamber 16 therebeneath. This chilling or refrigerating action as well as the withdrawal of a portion of the liquid contents of the chamber 16, serves to lower the pressure thereof and as a concomitant thereof to lower the temperature to which the fluid therein is subjected. The liquid or vapor sprayed into the vapor chamber 18 recondenses, as at night, and is collected and returned by the conduits 140 to the sump 142, where the same is further cooled by its position in the coolest region of the tank. When the pressure has dropped sufficiently in the storage chamber 16, this relative reduction of pressure compared to the increased pressure existing in the vapor chamber 18 and the sump 142 which is in free pressure communication therewith, serves to force the cooled fluid by means of return conduits 146 into the hottest portions of the storage chamber 16, serving thereby to further cool the same.

The above described arrangement serves to produce an intermittent circulation of the fluid received in the tank 10 from its coolest to its hottest portion in order to alleviate the rising temperatures to which the upper portions of the tank are subjected, and to thereby lower the peak temperature and pressures to which the storage and transportation tank 10 is subjected.

As hereinbefore set forth, the various fluid discharge and return systems are operable automatically by and in response to pressure changes in the pressure differential between the storage chamber 16 and the vapor chamber 18, and hence, in view of the relatively large quantities of liquid involved operate at relatively long intervals. For example, the previously described systems in a tank of about 90 feet in length and about 9 feet in diameter will when operated in hot water and exposed at the direct rays of the sun, have an automatic actuation of six to twelve times during the day. Clearly with such an arrangement, the extent of the commingling of the refrigerated or cooled portions of the liquid with the rest of the liquid in the tank occurs at relatively long intervals and is not relatively thorough. It may be frequently found desirable to interpose in either the discharge or the return conduit system or in both, a pressure producing means for obtaining the desired differential pressure between the various elements of the circulating system, or for augmenting pressure differentials which are created and obtained in the manner set forth hereinbefore. Further, it will be evident that pressure producing means such as pumps or the like may be directly applied to either of the compartments 16 or 18 as an auxiliary or a substitute for the thermodynamic pressure pumping action above mentioned.

Furthermore, the refrigerating or cooling action which is a concomitant of the fluid to circulation, may be enhanced and augmented by auxiliary refrigerating and cooling systems.

It is to be further understood that although the illustrations have depicted the partition 14 as either concaved or convexed with respect to the walls of the tank 10, the invention may be realized by partitions of various other configurations. For example, a partition having planar, sloping sides may be employed and the discharged liquid may be caused to flow down the sloping sides to a collection trough or troughs, both to provide the cooling action desired as well as to collect and accumulate the discharged liquids in sumps. The rate of flow over the sloping surfaces whether planar or curved, may be utilized more efficiently by providing baffles or channels thereon to cause the descending liquid to follow more or less tortuous paths and hence prolong its heat exchange relation with the surface of the partition.

The modification of Figure 5 is identical in every respect as to construction and mode of operation to that disclosed in Figure 2, except that conduits 140, 146, and 153 communicate with a sump 143 which instead of being disposed in the interior of the tank 10, in the same manner as the sump 142 of Figure 2, is disposed below the tank on the exterior surface thereof. In this location, the sump is thus positioned at the lowest possible location on the barge whereby the maximum cooling effect may be produced, and the sump may further perform certain of the functions of a keel during the movement of the barge.

Figure 6:
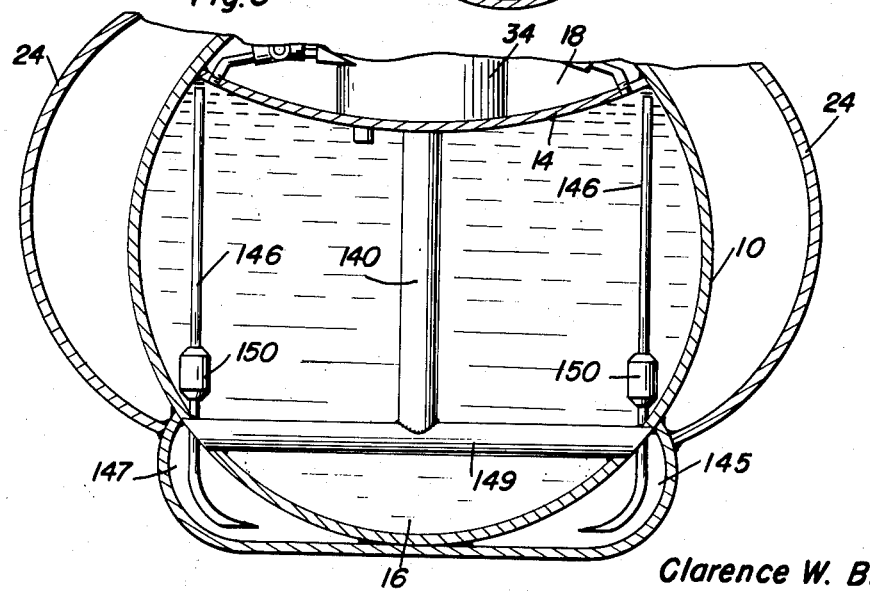

A still further modified construction of Figure 6 is likewise identical as to method of operation and construction to the form shown in Figures 1–4, except as to the sump construction. In the arrangement shown in Figure 6, a pair of longitudinally extending sumps 145 and 147 are provided on the exterior surface of the barge below the lowermost portion of the same. These sumps extend from the lowermost portion to the lower edges of the sponsons or blisters. The two sumps 145 and 147 are preferably connected to each other by a horizontally extending conduit 149 passing through the interior of the tank of the barge and the previously mentioned conduits 140 and/or the conduits 153 may communicate with the horizontally disposed conduit or conduits 149.

In the arrangement of Figure 6, it will thus be apparent that the provision of the sumps upon the exterior lower portion of the barge does not in any way increase the draft of the barge below the lowermost point of the tank of the same, while positioning the sumps at the coolest location upon the barge.

From the foregoing, it is thought that the mode of employing the method and apparatus hereinbefore set forth, together with their numerous advantages will be readily perceived and further explanation is believed to be unnecessary. However, since numerous modifications and changes falling within the purview of the invention will be readily understood by those skilled in the art after a consideration of the foregoing specification and accompanying drawings, it is not desired to limit the invention to the exact method and constructions shown and described in the foregoing specification and annexed drawings, except as required by the appended claims.

Having described the invention, what is claimed as new is:

1. An apparatus for storing fluids comprising sealed storage and vapor compartments, discharge means responsive to a predetermined pressure for discharging fluid from said storage to said vapor compartment, means for cooling the discharged fluid, conduits for placing the cooled fluid in heat exchange relation with said storage compartment and return means for returning fluid from said vapor to said storage compartment when the pressure in the former exceeds that of the latter, said vapor and storage compartments being formed by a partition in a container, and a liquid condensate sump communicating with said vapor compartment but disposed remote therefrom and in said storage compartment.

2. The combination of claim 1 wherein said sump is disposed upon the bottom of said storage compartment.

3. The combination of claim 1 wherein said sump is positioned in a relatively cooler region of said storage compartment.

4. The combination of claim 1 wherein said partition has a liquid collecting trough therein, said partition sloping toward said trough and a connection between said trough and said sump.

5. The combination of claim 4 wherein said partition is dish-shaped to define a concave wall for said vapor compartment and a convex wall for said storage compartment, said trough being at the medial portion of said partition.

6. The combination of claim 5 wherein said return means includes passages extending from said sump into the storage compartment.

7. The combination of claim 6 wherein said passages extend into the storage compartment at the portion thereof contiguous to said partition.

8. The combination of claim 7 wherein said passages extend into the storage compartment at the sides of said partition.

9. An apparatus for storing volatile liquids comprising storage and vapor compartments each sealed against the atmosphere, means responsive to a predetermined pressure for discharging fluid from the storage to the vapor compartment, a sump disposed beneath the surface of liquid in the storage compartment, drain passage means extending from said vapor compartment to said sump, means for returning fluid from said sump to said storage compartment.

10. The combination of claim 9 wherein said sump is disposed entirely within said storage compartment.

11. The combination of claim 9 wherein said drain passage means includes a first conduit directly connecting said vapor compartment and said sump, and other conduits connecting spaced portions of said vapor compartment to said first conduit.

12. The combination of claim 9 wherein said sump is exterior to said storage compartment and in contiguous heat exchange relation therewith.

13. The combination of claim 12 wherein said return means includes conduits extending into said storage compartment.

14. The combination of claim 9 wherein said sump is exterior to said storage compartment and in contiguous heat exchange relation therewith, said drain passage means including a conduit extending through said storage compartment.

15. The combination of claim 14 wherein said return means including conduits extending into said storage compartment.

16. A barge for transporting volatile liquids comprising a hull consisting of a tank component having storage and vapor compartments therein a sump upon the bottom wall of the storage compartment, means responsive to a predetermined pressure for educting fluid in its liquid phase from the storage compartment and delivering the educted fluid to the sump, means for returning fluid in its liquid phase from said sump to said storage compartment.

17. The combination of claim 16 wherein said sump is disposed upon the underside of said tank component.

18. The combination of claim 16 wherein said discharge means includes a connection from said storage compartment to said vapor compartment and a conduit connecting the vapor compartment to said sump.

19. The combination of claim 16 wherein said sump is disposed upon the underside of said tank component, blisters on said tank component, said blisters having their lower portions secured to said sump.

20. The combination of claim 16 wherein said sump being disposed upon the underside of said tank component, said sump has a bottom wall which at its intermediate portion is secured to the bottom wall of said tank component whereby are defined opposed chambers on opposite sides of said tank component.

21. The combination of claim 20 including a conduit extending through said tank and having opposite ends opening into said opposed chambers.

22. The combination of claim 21 wherein said conduit comprises a part of said discharge means.

23. The combination of claim 16 including a partition in said tank dividing the latter into said vapor and storage compartments, said discharge means including a pipe extending through said storage compartment and having its opposite ends extending through and secured to the partition and bottom wall of the storage compartment and communicating respectively with the vapor compartment and the sump.

24. The combination of claim 16 wherein said sump is disposed upon the underside of said tank, said sump having a bottom wall which at its intermediate portion is secured to the bottom wall of said tank whereby are defined opposed chambers on opposite sides of said sump, a conduit extending through said tank and having opposite ends opening into said opposed chambers, said discharge means including a pipe having one end secured to the top wall of the storage compartment and communicating with said vapor compartment and having its other end communicating with and secured to said conduit.

25. An apparatus for storing volatile liquids comprising storage and vapor compartments each sealed from the atmosphere, a sump within the storage compartment and immersed in the liquid therein, means responsive to a predetermined pressure in the storage compartment for educting fluid in its liquid phase therefrom and into the sump, and means for returning fluid in its liquid phase from the sump into the storage compartment.

26. The combination of claim 25 wherein said educting means including a means connecting said storage and vapor compartments and conduit means connecting said vapor compartment with said sump.

27. The combination of claim 26 wherein said conduit means has a portion extending into said storage compartment and in direct heat exchange relation with the volatile liquid confined therein.

References Cited in the file of this patent

UNITED STATES PATENTS

| | | |
|---|---|---|
| 1,371,427 | Kerr | Mar. 15, 1921 |
| 2,059,942 | Gibson | Nov. 3, 1936 |
| 2,344,765 | Dana et al. | Mar. 21, 1944 |
| 2,408,505 | Brandon et al. | Oct. 1, 1946 |